(12) United States Patent
Bianconi et al.

(10) Patent No.: US 9,238,413 B2
(45) Date of Patent: Jan. 19, 2016

(54) BATTERY CHARGER BY PHOTOVOLTAIC PANEL

(75) Inventors: Enrico Bianconi, Grugliasco (IT); Carlo Cullino, Grugliasco (IT); Vincenzo De Pierro, Grugliasco (IT); Angelo Fiando, Grugliasco (IT); Michele Tedeschi, Grugliasco (IT)

(73) Assignee: BITRON SPA, Turin (IT)

( * ) Notice: Subject to any disclaimer, the term of this patent is extended or adjusted under 35 U.S.C. 154(b) by 304 days.

(21) Appl. No.: 13/824,332

(22) PCT Filed: Aug. 25, 2011

(86) PCT No.: PCT/IB2011/001964
§ 371 (c)(1),
(2), (4) Date: Aug. 27, 2013

(87) PCT Pub. No.: WO2012/035384
PCT Pub. Date: Mar. 22, 2012

(65) Prior Publication Data
US 2013/0335001 A1 Dec. 19, 2013

(30) Foreign Application Priority Data
Sep. 16, 2010 (IT) .............................. TO2010A0756

(51) Int. Cl.
*H02J 7/00* (2006.01)
*H01M 10/44* (2006.01)
*H01M 10/46* (2006.01)
*B60L 11/18* (2006.01)
*H02J 7/35* (2006.01)

(52) U.S. Cl.
CPC ........... *B60L 11/1809* (2013.01); *H02J 7/0034* (2013.01); *H02J 7/0045* (2013.01); *H02J 7/35* (2013.01); *Y02E 10/566* (2013.01); *Y02E 10/58* (2013.01)

(58) Field of Classification Search
CPC ... B60L 11/1809; H02J 7/0034; H02J 7/0045; H02J 7/35; Y02E 10/566; Y02E 10/58
USPC .......................................................... 320/101
See application file for complete search history.

(56) References Cited

U.S. PATENT DOCUMENTS

| 6,204,645 B1 | 3/2001 | Cullen |
| 2002/0109952 A1 | 8/2002 | Rapsinski et al. |

(Continued)

FOREIGN PATENT DOCUMENTS

| EP | 1 330 009 A2 | 7/2003 |
| EP | 2 221 937 A2 | 8/2010 |
| WO | WO 2010/083460 A1 | 7/2010 |

OTHER PUBLICATIONS

International Search Report for PCT/IB2011/001964 mailed Dec. 15, 2011 (3 pgs.).

*Primary Examiner* — Vuthe Siek
(74) *Attorney, Agent, or Firm* — Merchant & Gould P.C.

(57) ABSTRACT

A charge control system of one or more batteries B is electrically connected with one or more solar panels S, so configured to obtain the maximum transfer of power from such one or more solar photovoltaic panels S and for controlling the charge of the one or more batteries B. The control system includes: at least one tracking device of the point of maximum power or MPPT 2 adapted to adjust one of its input impedance seen from panels S for a power adaptation with panel S; at least one protection circuit of the system 3 adapted to avoid damages to the charge control system caused by inverted currents, coming from such battery B and from one or more electric equipment 8 connected with it.

10 Claims, 3 Drawing Sheets

(56) References Cited

U.S. PATENT DOCUMENTS

2006/0067199 A1* 3/2006 Tanaka ........................ 369/121
2009/0078300 A1* 3/2009 Ang et al. .................... 136/244
2010/0084208 A1   4/2010 Chen et al.
2010/0237829 A1* 9/2010 Tatebayashi et al. ......... 320/118
2011/0026171 A1* 2/2011 Pavlin ............................ 361/20
2012/0136534 A1* 5/2012 Walsh et al. ................... 701/36

* cited by examiner

BATTERY CHARGER BY PHOTOVOLTAIC PANEL

This application is a National Stage Application of PCT/IB2011/001964, filed 25 Aug. 2011, which claims benefit of Serial No. TO2010A000756, filed 16 Sep. 2010 in Italy and which applications are incorporated herein by reference. To the extent appropriate, a claim of priority is made to each of the above disclosed applications.

BACKGROUND OF THE INVENTION

The present invention relates to a charge controller, obtained through photovoltaic solar panels, adapted for recharging a battery and preferably applied to automotive sector.

Normally the recharge of the batteries present in motor vehicles occurs through one or more alternators, which generate a very high power.

Said power is used for the recharge of the batteries.

Such alternators are electric devices which intrinsically are sources of electromagnetic noise.

Such noise generated by the alternator must be so limited in order to avoid damaging the electronic devices comprised inside the motor vehicle.

In the automotive field, the devices and electronic circuits present in the motor vehicle, must fulfill numerous Standards regarding electromagnetic compatibility.

Every circuit and electronic device is in fact an involuntary source of electromagnetic noise which, through the connection lines among the various devices, spread in the various circuits and neighboring devices.

The electronic devices, when subject to electromagnetic conducted or radiated noise, can modify their behavior so causing problems to the circuit in which they are operating.

Such problems can be different as for example when wrong data are received or one or more devices are damaged when not the entire circuit.

Systems of solar panels are further known, which through the tracker of the point of maximum power, known with the abbreviation MPPT, reach the maximum of the performances of the solar panel, by varying the working point on the voltage/current function of the photovoltaic solar panel, in function of the level of solar radiation.

Usually solar panels are placed on the top of buildings and in solar fields.

In such applications the power with which the panels are irradiated, varies slowly during the day.

Usually the solar panels are used for generating electric energy which, when suitably converted, is input into the grid as an alternate current (50 Hz or 60 Hz).

The control circuit in such applications comprises an MPPT which must follow the even slow variations of the irradiation of the panel, so that the maximum transfer of power is guaranteed; downstream of it the inverter device converts such energy from continuous current to alternate current inputting it thereafter in the electricity supply.

Said inverters further play a protective role for the system upwards, and in particular for the MPPT device, from the noise in the electricity network.

Solar panels applied on vehicles are further known, as for example automobiles defined as hybrid in which in addition to the internal combustion engine an electric motor is present which, by cooperating with the internal combustion engine, reduces the fuel consumption of the vehicle.

The electric motor of such hybrid cars is supplied by solar panels and batteries.

Said batteries usually cumulate the energy produced by the panels when the energy produced by the panels is not instantaneously exploited neither by the electric engine, nor by other electronic devices present on the vehicle.

Patent application US2010084208A1 actually describes such application but it does not give a technical solution to the control of the energy produced by the solar panels, to the achievement of the maximum power from such panels when boundary conditions vary, nor it indicates devices for the control and preservation of the system itself from the noise.

The batteries are very sensitive devices which rapidly and very easily lose their technical features so reducing their useful life.

Furthermore the voltage at the ends of the battery varies as a function of at least: the temperature, the external temperature and the level of charge of the battery itself.

It is known that an overcharge and/or over-discharge of the battery penalizes the future performances of the battery itself by consequently reducing the useful life of such device.

Normally the solar panel is adapted in power, in order to transfer the maximum power to the circuits downwards, so totally exploiting the normally limited power produced by the panel itself.

So it is very complicated to interface a solar panel with a battery, as the voltage at the ends of the two devices varies even with the variation of the temperature but following different functions.

Furthermore it is difficult to preserve the overall system, in addition to the solar panel and the battery, from possible damages which can compromise the useful life of the devices.

A further problem of the application of solar panels to the automotive field relates to the safety of the device as the MPPT device which, in this kind of applications, is more subject to noise which can cause its malfunction if not its breaking.

In particular, in the automotive field the battery is subject to particular electric impulses, as for example the impulse generated when a power source device is left in open circuit condition for more than a determined period of time and to which a charge is subsequently connected.

Such impulse is known as Load-dump and has a limited duration as defined by the automotive Standard ISO7637.

Said problem arises from the lack of a protection device from the noise which, in its classical applications was made by the inverter.

Patent WO2010/083460A1 describes a control system of the charge produced by a solar panel for managing various devices comprised in a motor vehicle as air conditioning, lights fans etc., without describing in detail neither the control nor the protection circuits of the system itself from possible electromagnetic noise which can damage the system itself.

U.S. Pat. No. 6,204,645B1 describes a control circuit of the charge produced by solar panels for storing and/or instantaneously using such charge, which does not provide for the use of a MPPT for always obtaining the maximum power transfer.

SUMMARY OF THE INVENTION

BRIEF DESCRIPTION OF THE DRAWINGS

Features and advantages of such control system will be better clarified and evident from following description of an embodiment with reference to annexed figures, which in particular show.

DETAILED DESCRIPTION OF THE PREFERRED EMBODIMENTS

Figure 1:
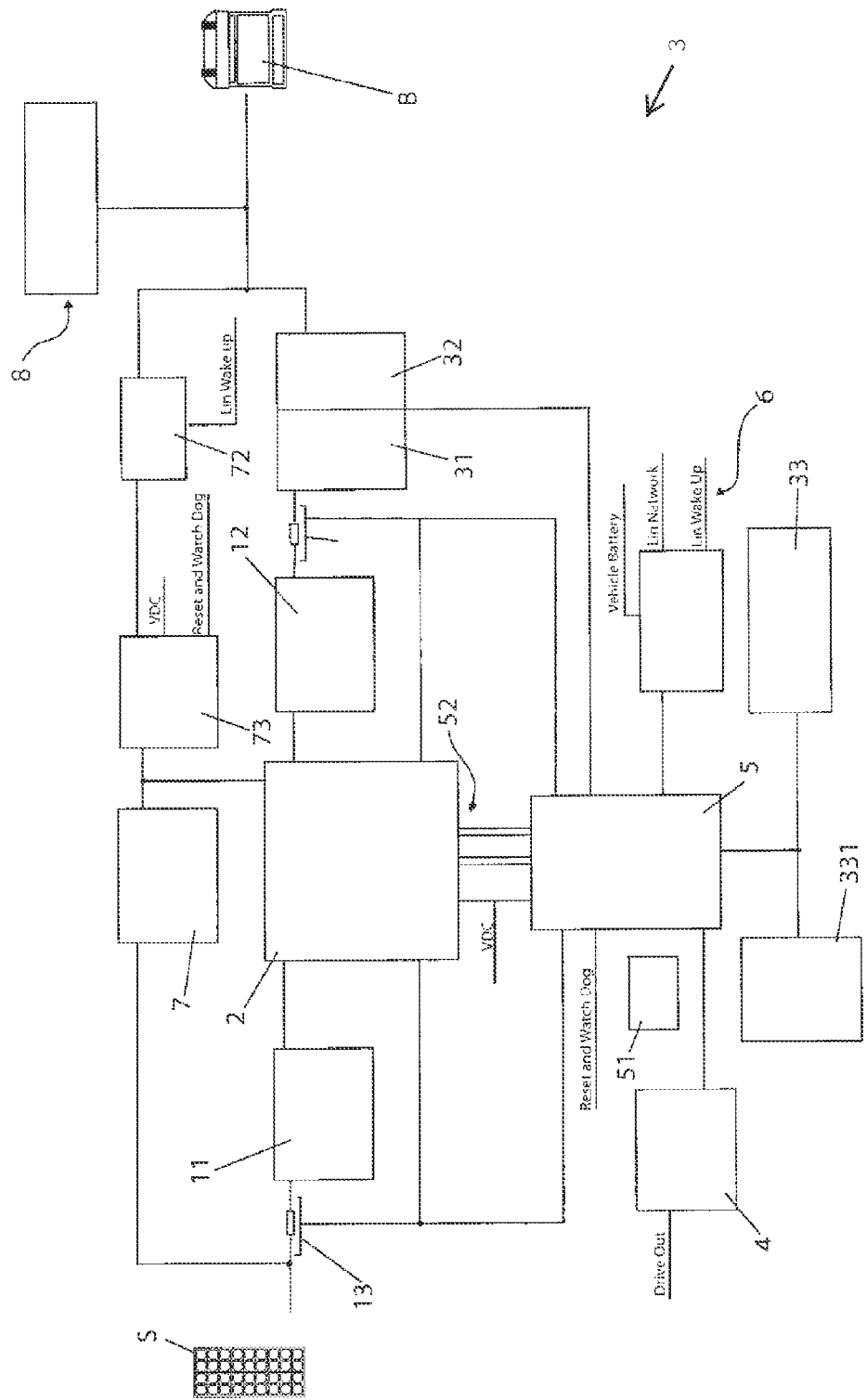
FIG. 1 shows the block diagram of the charge control system according to the present invention.

With reference to cited figures, the charge control system of one or more battery B is electrically connected with one or more solar photovoltaic panel S and is so configured to obtain the maximum power transfer from said one or more panels S and for controlling the charge of said one or more battery B.

Said control system comprises:
- at least one tracking device of the point of maximum power or MPPT 2 adapted for regulating at least one of its inlet impedance seen from panels S for a power adaptation with the panel S;
- at least a circuit protection system 3 adapted to avoid damages to the charge control system caused by inverted currents, both generated by one or more electric installations 8 connected with said battery B, or coming from battery B itself.

Said electric installations 8, in the automotive field, are for example all connecting equipments of the devices of the motor vehicle to battery B as for example the alternator, the lighting equipment, the ventilation equipment, the control equipment, and so on.

Such control system of a charge further comprises at least one electronic control device 5 adapted to control:
- said at least one device MPPT 2;
- said at least protection circuit 3;
- at least one controlling device 4 for the management of the power towards the users;
- at least one telecommunication system 6, adapted for the data communication preferably with a vehicle, where such charge control system is applied.

Said charge control system also comprises at least an auxiliary power supplier 7 which generates one or more voltages of a predetermined value.

Said supplier 7 uses at least a portion of the charge coming from the solar panels S for feeding at least one of the devices comprised in the control system.

Said auxiliary supplier 7 is adapted to generate the voltages suitable for charging the various electro-electronic devices present in the system according to the present invention.

The present system is preferably applied to motor vehicles or boats as for example motor-or sailboats.

The motor vehicle on which such system is preferably implemented, is for example a bus or a truck, camper, etc. in addition to the common cars.

The present system in the following embodiment preferably fulfills all automotive Standards of the series ISO, CISPR and EC, so obtaining a reliable product with high reliability for its function.

The electromagnetic noise is one cause of at least one first portion of such inverted currents cited before.

There are two main electromagnetic noise present in the automotive field: conducted noise and radiated noise.

The radiated noise, which from the outside world radiate the charge system according to the present invention, are preferably removed by the metal housing in which such system is closed.

For managing the conducted noise, that is that which is transferred along the circuits by the conductive means as cables or interconnection tracks, it is used, at least in part, said at least one protection circuit of system 3.

A second portion of inverted currents are caused by human errors as for example the inversion of the polarity of battery B, which generates an inverted current towards the charge control system.

Protection circuit 3 comprises at least one inverted connection protection or anti-reverse-battery device 31, at least one surge protection device or load-dump device 32, at least one control or cut-off device 33.

Said at least protection device with an inverted connection or anti-reverse battery 31 is adapted to avoid voltage inversions of batteries B for example in the case in which such inverted tension are lasting for a predetermined time with a high voltage. Anti-reverse-battery device 31 is activated preferably if a negative voltage persists greater than 10 V.

The inversion of polarity of the battery causes the discharge of the battery instead of being charged, generating an inverted current.

Said anti-reverse-battery device 31 is preferably made through at least one MOSFET transistor, for example a power transistor polarized in order to fulfill the functions of a switch.

Said anti-reverse-battery device 31 is connected preferably in series with battery B.

Said anti-reverse-battery device 31 is adapted to block the current flow from the battery to the charge control system, should battery B itself be connected with the system with the inverted polarization with respect to the one desired.

Protection circuit 3 comprises, as mentioned before, at least one load-dump protection device 32, adapted to avoid damages caused by high voltage pulses, commonly known as load-dump.

Figure 3:
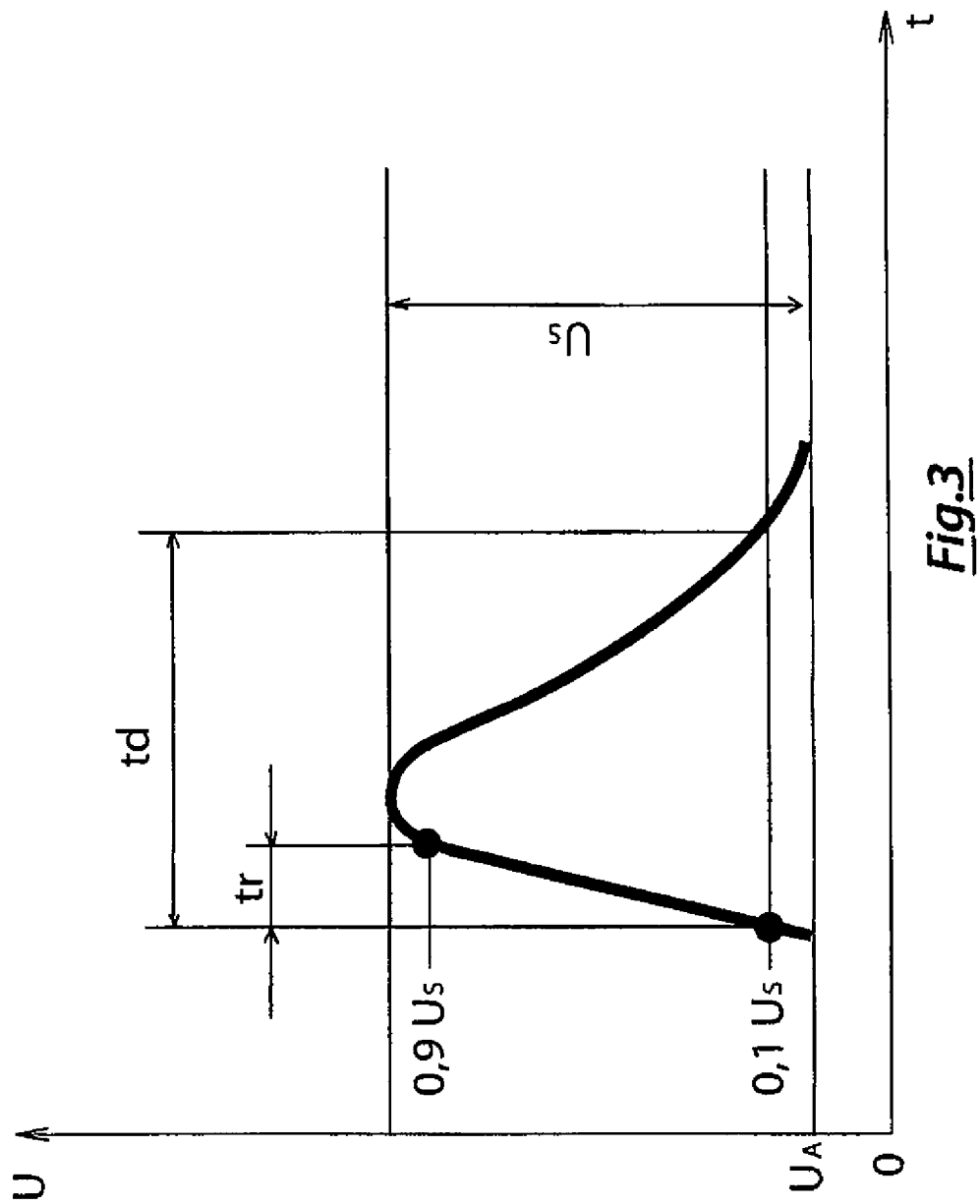
FIG. 3 shows a typical load-dump impulse described by the automotive Standards.

One example of such pulse is shown in the annexed FIG. 3.

Said voltage can reach a peak of even some hundreds volts in function of the nominal voltage of batteries B.

Said load-dump protection device 32 is preferably realized through at least one MOSFET transistor, for example a power transistor polarized in order that it fulfills the function of a switch preferably connected in series with battery B.

Said load-pump protection device 32 is adapted to stop the flow of current towards the charge control system as quickly as possible, should a load-pump peak occur.

Figure 2:
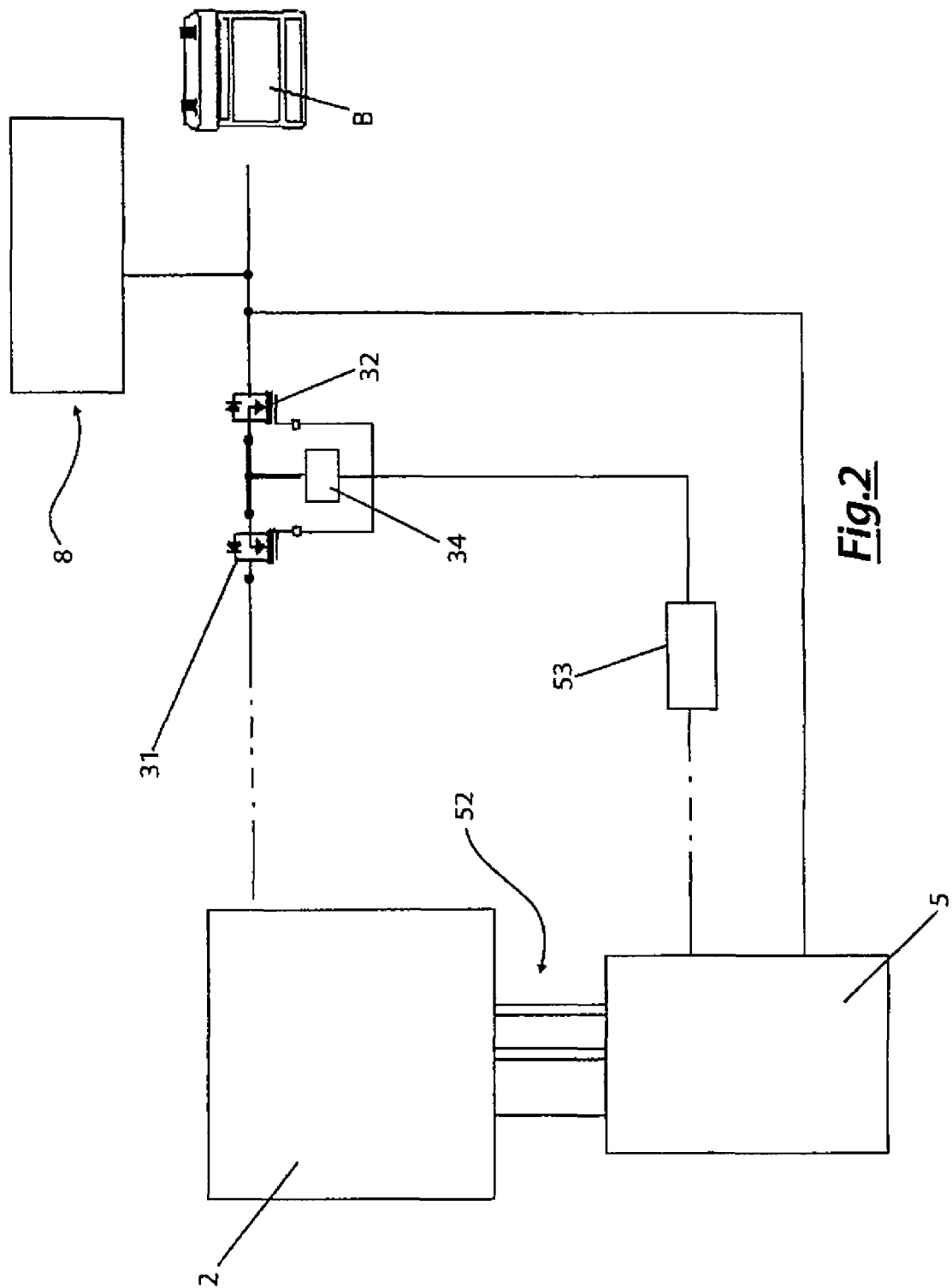
FIG. 2 shows in detail the essential circuit diagram of a protection circuit of the system according to the present invention.

In the descriptive and non limitative embodiment shown in FIG. 2, anti-reverse-battery device 31 and surge protection device 32 are both connected in series with battery B.

Electronic control device 5 manages the two devices (31 and 32), by controlling at least one impulse generator 53 which activates or deactivates the function of said devices (31 and 32), and by controlling at least one tension multiplier or charge-pump 34, as a function of the voltage measured at the exit gate of the charge control system.

Impulse generator 53 is connected both with the two devices (31 and 32) cited before, and with voltage multiplier or charge-pump 34, which is adapted to obtain power sources with higher or lower voltages of the ones made available by the supplier, useful for both devices (31 and 32) for solving their purposes. Such at least one cut-off device 33 is adapted to block and adjust the charge of battery B.

If for example the temperature, preferably the one measured on battery B, exceeds a first threshold T1, upper extreme of a predetermined temperature range, then such cut-off device 33 stops the charge of battery B until the temperature does not return within such predetermined temperature range for example if it is reduced to a temperature T2.

Usually threshold T1 is at a higher level with respect to threshold T2.

Said cut off device 33 stops the charge of battery B when the measured temperature, preferably on battery B itself, goes out of such predetermined temperature range, which implies that if the temperature falls down to a critical temperature T3, equal to the lower limit of the temperature range, cut-off device 33 stops the charge of battery B.

In case of reaching temperature T3, the charge of the battery will occur for example only when a temperature T4 greater then T3 will be reached.

The data obtained by the cut-off device are processed by electronic control device 5, in addition to the data coming from further devices of the system, in order to control the maximum transfer of power between panel S and battery B.

The spot in which such temperature measurement occurs can be;
- directly placed on battery B as cited before, through at least one temperature sensor 331 for example one thermocouple and the data of which are sent to the charge control system, in particular to an electronic control device 5, through telecommunication system 6;
- by measuring the temperature of the external housing in which the charge control system according to the present invention is preferably housed, through at least one temperature sensor 331, as for example one or more thermocouples, connected with an electronic control device 5.

Temperature sensors 331, besides being implemented with the thermocouple, can be: thermistors; black body temperature sensors; infrared sensors; resistance sensors etc., all equally applicable by using the suitable circuits for their calibration.

Protection circuit 3 is adapted to protect the charge control system, unlike the control circuits normally used in the automotive field which are adapted to protect the circuits downwards the power generation systems adapted to recharge the batteries in the classical method.

The solar energy, which is converted by panel S in electric energy for recharging batteries B, is variable and limited in time.

The charge control system therefore is such to always transfer the maximum possible power from panel S to battery B and through protection system 3, to avoid that such system is damaged so invalidate the maximum transfer of power from panel S to battery B.

Said damages can be caused, as cited before, by electromagnetic disturbances caused by the electric/electronic equipment present in the motor vehicle.

Said at least one device MPPT 2 at its input receives the signal from panel S suitably filtered through at least one input filter 11.

Said input filter 11 is a low-pass filter adapted to reduce the high frequency components which can be present on the connection means between panel S and the device MPPT 2.

The types of noise as cited before can be both radiated noise received by the connection means, and conducted noise generated by one or more electric/electronic devices of the motor vehicle and diffused along all circuits and electric equipment 8 of the motor vehicle, which are connected with battery B.

The output signal from device MPPT 2 is in turn filtered by at least one output filter 12 before being transmitted to the circuits downwards.

Such output filter 12 is a low-pass filter adapted to reduce the high frequency components which can be present on the connection means between device MPPT 2 to battery B, for the reasons cited before.

Device MPPT 2 at its input further receives a predetermined and known fraction of the power produced by panel S, suitably extracted by an input deviator 13.

The fraction of power extracted through deviator 13 is used by device MPPT 2 for calculating the working point of panel S.

From such fraction of power device MPPT 2 modifies the value of the impedance which panel S must see, at the input of devices MPPT 2, for always obtaining the maximum power transfer from panel S.

For the same purpose at the outlet of device MPPT 2 a portion of the power is extracted, through at least one outlet deviator 14, at its output from device MPPT 2 and is driven to the input of device MPPT 2 itself.

Such power extraction is made in order to have a control on the output power and in order to always obtain an optimum recharging of the battery B by modifying its own output impedance.

Said adjustment of the output impedance permits to modify the output impedance of device MPPT 2, such that there is always the maximum transfer of power to battery B when it must be recharged.

As cited before, electronic control device 5 is adapted to control the correct functioning of device MPPT 2 and of the various devices cited before of the protection circuit so that during the normal operation device MPPT 2 always obtains the maximum transfer of power from panel S to battery B.

Said electronic control device 5 further suitably manages, in presence of a problem as for example a noise, protection circuit 3 so that the control system charges itself and that all devices comprised in it remain untouched by said noise being able to always operate in the optimum working conditions.

Through a sequence of phases, suitably stored inside at least one memory support 51, electronic control device 5 cyclically controls the various devices cited before, connected with it. Said memory support preferably is a non volatile support, for example memories E2Prom or equivalent non volatile memory technologies.

On such memory 51 support the operating phases are stored which permit to obtain the optimum charge control so avoiding the damaging of the devices.

The operative phases which are performed by the electronic control device are following:
a) controlling the power received from the solar panel and received by MPPT 2;
b) controlling the power output by MPPT 2;
c) sending control signals to MPPT 2 in order to obtain the maximum power transfer;
d) monitoring the temperature of battery B;
e) activating/deactivating cut-off device 33;
f) controlling the voltage value output from the system towards battery B;
g) activating/deactivating anti-reverse-charge device 31;
h) activating/deactivating the load-dump protection device 32;
i) managing telecommunication system 6;
j) packing data to send through telecommunication system 6;
k) managing the reset and Watch_Dog signal;
l) managing the user devices through controlling device 4;
m) managing voltage adjustment device or LDO 73;
n) controlling and making diagnostics of system.

The sequence of the operative phases can be different with respect to the one cited, as a consequence of the management method applied to electronic control device 5 for controlling the various devices.

In addition to this method, there is a function for the detection of the nominal value of the voltage of battery B, which is connected with the charge control system so that the charge control system can be adapted to battery B.

Electronic control device 5 further manages telecommunication system 6.

Said telecommunication system 6, comprised in the charge control system, is adapted to transmit and receive the various information both to/from the vehicle and to/from the external environment.

Telecommunication system 6 comprises at least one transceiver device 63, at least one serial network and/or at least one BUS network.

Such at least one transceiver device 63 manages the sending and receiving of data both of the serial network and of the BUS network.

Said transceiver device 63 further comprises preferably suitable filters for receiving and transmitting signals adapted for increasing at the most the signal-noise ration of the transmitted/received signals themselves.

The serial network preferably is a CAN network broadly implemented in the reference automotive and is widely tested.

The serial network further can be implemented with a LIN network less expensive but also broadly implemented in the automotive field and widely tested.

Electronic control device 5 is preferably a microcontroller which is more adapted to the control of other electric/electronic devices as the microcontroller implements counters, modulators, controllers, etc., and various controlling gates and a plurality of gates for the data transmission.

Such features are valid for all of the microcontrollers on the market which only difference will consist on the different development of the following features.

In the preferred embodiment said electronic control device 5 is implemented with a microcontroller preferably with following technical features:
a data bus of at least 16 bit;
an indexing bus of at least 16 bit;
a single chip structure.

The part of charge extracted from an input deviator 13 is further transmitted to an input gate of electronic control device 5, so that it has a further control of the input power to device MPPT 2, so that it controls it in the right way.

The BUS signals further comprise at least a control bus 52 which is adapted for permitting the data exchange between MPPT 2 and electronic control device 5.

The information transmitted through control BUS 52 are such to optimize and facilitate the task of device MPPT 2.

Such at least one controlling device 4 is preferably implemented through at least one power transistor able to generate an output power adapted to control one or more device comprised in the vehicle as for example: fans for cabin cooling; radio and stereo; travel refrigerators, lighting equipment and headlights, etc.

Such at least one transistor is preferably implemented in a MOSFET technology in order to have an optimum efficiency and high performances so reducing the consumption.

Electronic control device 5 further manages an activation device 72 which permits to activate the charge control system for one of its diagnostic procedures even independently from a level radiated by the solar light of said solar panel S, for example during the night or in a workshop adapted to control the system.

The overall charge control system preferably is supplied only by the energy coming from panel S.

The charge control system takes a "standby" configuration when the level of solar radiation is not sufficiently high to guarantee the perfect function of the system.

In such configuration preferably said charge control system keeps electronic control device 5 close and a plurality of other devices is disabled so reducing the consumption.

By keeping electronic control device 5 on the alert it is immediately ready to resume its full activity bringing the charge control system in an operative condition of a "top speed working", in which all devices are active.

In absence of a solar radiation of panel S for a determined time, the system takes a "disabled" operative configuration, in which all devices of the system have been deactivated.

A further state of the system is also comprised in which the system is totally deactivated.

Said actuating device 72 substantially performs a deviation function on the supply source so permitting to insert an auxiliary supply should no energy reach the system from panels S sufficient to supply itself. After the actuation of actuating device 72 electronic control device 5 performs the operative phase n of control and diagnostics of the system, by analyzing the various devices of the system in order to find out possible damages or function anomalies.

In an alternative embodiment said actuating system 72 also comprises a remote control device which permits to perform operative phase n of control and diagnostics of the system, from a distance through for example a transceiver device.

Said transceiver device totally fulfills all Standards of electromagnetic compatibility of the automotive field.

Voltage adjustment device 73 generates a stable voltage at a predetermined value used for supplying the electronic devices.

The present invention aims to realize a charge control system applied to a motor vehicle which thanks to the tracking device of the point of maximum power or MPPT 2, is able to position itself in the correct point of the characteristic voltage/current of solar panel S so to guarantee the maximum transfer of power to batteries B.

Said device MPPT 2 permits, by varying the input impedance seen by solar panel S, to always reach the maximum power transfer from panel S itself, so avoiding its damaging; furthermore system protection circuits 3, adapted to save the charge control system itself, avoid that noise of electromagnetic kind, coming from electric equipment 8 comprised in the motor vehicle, and/or human errors, as for example the inversion of polarity of battery B, can damage the devices comprised in the system itself.

Control device 5 is adapted to manage the whole of the devices cited before, so reaching both the better performances by the charge control system according to the present invention, and the optimum management of protection circuit 3 in case of anomalies.

The present invention permits to lengthen the useful life of the devices of the system as the system is protected by possible damages as described before.

The present invention can further be applied in civil environments by utilizing the system according to the present invention for charging battery B through solar panels S placed for example on buildings or solar-fields, should not be possible to introduce the energy produced in the electric network or should it not be possible to use an inverter.

The invention claimed is:

1. Control system for charging one or more batteries and electrically connected with one or more solar panels placed on a vehicle or boat, configured to obtain maximum transfer of power from said one or more solar panels and to control a charge of said one or more batteries of said vehicle or boat; said control system comprising:
   one tracking device of the point of maximum power or MPPT for regulating one inlet impedance seen from the panels for always having a power adaptation with the panel;
   at least a protection circuit of the system for avoiding damages to the charge control system caused by electromagnetic noises and inverted currents coming from said batteries, of said vehicle or boat, and from one or more electric plants connected with the batteries; said at least one protection circuit of the system comprising:

an anti-reverse battery device for preventing inversions in charge flow of the batteries;

at least one load-dump device or surge protection device, for avoiding damage of the system caused by high-voltage pulses;

at least one cut-off device, for blocking and adjusting the charge of the batteries according to temperature of the batteries.

2. System according to claim 1, further comprising an electronic control device for controlling:

said one device MPPT;

said at least one protection circuit;

at least a controlling device for management of the power towards users;

at least one telecommunication system, for data communication.

3. System according to claim 2, comprising at least one operative configuration, selected among the following operative configurations:

a) top speed working, wherein all devices are operating;

b) stand by, wherein the electronic control device is kept on alert and a plurality of other devices is deactivated by reducing consumptions;

c) deactivated, wherein all of the devices in the system are deactivated;

d) diagnostic, wherein the system performs a diagnostic procedure.

4. System according to claim 1, further comprising at least an auxiliary power supply producing one or more voltages of a predefined value by using at least a portion of the charge coming from the solar panels for supplying at least one of the devices comprised in the control system.

5. System according to claim 4, wherein the system further comprises an actuating device which permits actuating the control system of the charge for a diagnostic procedure independently from a radiation with sunlight of said solar panel.

6. System according to claim 5, wherein the actuating device comprises a remote control device which permits to configure the system in the operating configuration d) of remote diagnostic.

7. System according to claim 1, wherein both the device with the anti-reverse-battery and the device with the load-dump protection are each implemented with at least one MOSFET power transistor.

8. System according to claim 7, wherein the device with the anti-reverse-battery and the device with the load-dump protection are connected in series with the batteries.

9. System according to claim 8, wherein the device with the anti-reverse-battery and the device with the load-dump protection are controlled by the control device by at least one pulse generator and at least a voltage multiplier or a charge-pump.

10. Control system for charging one or more batteries and electrically connected with one or more solar panels placed on a vehicle or boat, configured to obtain maximum transfer of power from said one or more solar panels and to control a charge of said one or more batteries of said vehicle or boat; said control system comprising:

one tracking device of the point of maximum power or MPPT for regulating one inlet impedance of the panels for always having a power adaptation with the panel;

at least two protection circuits of the system for avoiding damages to the charge control system caused by electromagnetic noises and inverted currents coming from said battery, of said vehicle or boat, and from one or more electric plants connected with the battery;

at least an auxiliary power supply producing one or more voltages of a predefined value by using at least a portion of the charge coming from the solar panels for supplying at least one of the devices of the control system; and an actuating device permitting actuating the control system of the charge for a diagnostic procedure independently from a radiation with sunlight of said solar panels.

* * * * *